United States Patent [19]

Kumar

[11] Patent Number: 4,948,397
[45] Date of Patent: Aug. 14, 1990

[54] METHOD, MEANS AND DEVICE FOR SEPARATION OF PARTICULATE MATTER FROM A CARRIER MEDIUM

[76] Inventor: Prabhat Kumar, C-5/16, Safdarjung Development Area, New Delhi-110016, India

[21] Appl. No.: 383,294

[22] Filed: Jul. 12, 1989

Related U.S. Application Data

[63] Continuation of Ser. No. 153,985, Feb. 9, 1988, abandoned.

[51] Int. Cl.$^5$ .............................................. B01D 46/04
[52] U.S. Cl. ........................................ 55/96; 55/97; 55/242; 55/259; 55/300; 55/400; 55/290
[58] Field of Search ................ 55/300, 290, 242, 400, 55/259, 97, 96; 210/780, 402

[56] References Cited

U.S. PATENT DOCUMENTS

| | | | |
|---|---|---|---|
| 1,303,008 | 5/1919 | Anderson | 55/300 |
| 2,178,463 | 10/1939 | Bahnson | 55/290 |
| 2,648,396 | 8/1953 | Kirbu | 55/400 |
| 2,670,849 | 3/1954 | Dunmire | 210/402 |
| 3,327,457 | 6/1967 | Linsl | 55/290 |
| 3,966,441 | 6/1976 | Freze | 55/290 |
| 4,654,059 | 3/1987 | Matyas | 55/403 |

FOREIGN PATENT DOCUMENTS

| | | | |
|---|---|---|---|
| 858316 | 12/1970 | Canada | 55/400 |
| 717848 | 11/1954 | United Kingdom | 55/403 |

Primary Examiner—Bernard Nozick
Attorney, Agent, or Firm—Ladas & Parry

[57] ABSTRACT

Separation of particulate matter in the form of solids, liquid particles and mixtures thereof from a carrier medium comprising of air, vapor, gases, flue or mixtures thereof by means of a moving form having a moving surface with perforations or apertures which causes the particulate matter to be blocked, intercepted, impacted and deflected away resulting in clean air, vapor, gases etc. devoid of any particulate matter.

13 Claims, 2 Drawing Sheets

METHOD, MEANS AND DEVICE FOR SEPARATION OF PARTICULATE MATTER FROM A CARRIER MEDIUM

This is a continuation of copending application Ser. No. 0 7/153,985 filed on February 9, 1988, now abandoned.

FIELD OF THE INVENTION

The invention generally relates to separation of particulate matter from carrier medium and to the specific removal of particulate matter from air, gases, flue or mixtures thereof. More specifically, the invention relates to a method, means and a device for the separation of particulate matter from carrier medium.

BACKGROUND OF THE INVENTION

The hazards of pollution have become so great that numerous methods and devices have been evolved, many of which hardly require any elaboration thought for a proper appreciation of the inventive concept, I shall briefly deal with the following methods which are in vogue.

Settling and momentum separators: Particles are collected by gravity settling and by inertia when the gas stream changes the direction of flow. In the settling chamber the stream speed is reduced to allow particles to settle down. This system requires large volume of equipment and what is more is effective for very large particles (about 70 microns).

Momentum separators are relatively more compact yet quite voluminous. In some cases only are they operative in the medium to large particle size range (about 20 microns). Low density particles, (less than 1 gm. per cc.) because of their low mass make these systems less effective.

Mechanical separators, cyclone: Vortex motion is applied to the particulate carrying stream, the higher centrifugal force on the particle caused by the circular motion makes large and medium size and weight particles to separate from the stream flow. The vortex motion can be applied to the carrier stream in several ways: with a fixed impeller, with a rotating turbine or by admitting the carrier stream, at high speed, tangentially in an annular space as in the case of reverse flow cyclone. Use of various shapes, sizes, multipletube cyclones and techniques like irrigation of particle give good entrapment effectively (order of 90%) for only large and medium particle size (10-30 microns) with increased energy consumption (up to 75-125 mm, 3-5 inch water column pressure drop).

Electrostatic precipitation: A very high voltage electrical discharge corona, from the corona electrodes is used to electrically charge particulate matter, conditions permitting, depending on features like particle electrical resistance characteristics, chemical composition, temperature, presence of carbon monoxide pockets, explosive media etc. The charged particles slowly difuse across the stream flow attracted to the discharge electrode where they discharge, collect and are released using various rapping devices, re-entrant protection, airlock etc. Conditioning of particle by water spraying, ammonia injection and other agents is also used to alter the particle characteristics. However, for high entrapment efficiency and high particle load in carrier medium, high energy is consumed and scope of application is limited by the aforesaid application constraints, besides operative drawbacks like particle composition and loading variation, reinterant of particles, variation in temperature, discharge electrode failure, blackout due to carbon monoxide pockets and the like make the system output performance quite sensitive.

Wet collectors, scrubbers: Liquid, generally water, is used to combine with the particles of the carrier medium to make the particles grow, increase in size, agglomerate and be collected. Interception and impingement are the predominant mechanisms in wet scrubbers. Equipments like spray towers, packed towers, impingement plate towers with medium energy consumption, are effective for medium size (5-10 microns) particle, give reasonable efficiency (-95%) with medium pressure drop (25-150 mm, 1-6" water column) and water consumption (up to water 3 ltr/m$^3$). The high efficiency venturi scrubber imparts high velocity to the carrier medium by a converging cone and inject water at low pressure. Water, liquid, combines with the particles. The collection efficiency is high (order of 99%). However, the energy consumption is very high as pressure drops (up to 1750 mm, 70 inches water column), besides, particle wetting characteristics, condensation of moisture and drop evaporation, operating temperature are some of the features which affect the collection and limit viable application and creates the added problem of waste liquid handling.

Filtering: Particulate matter is entrapped by inertia, impingment, diffusion, interception and in certain cases by electrostatic force in a filter media, like woven fabric, or felt cloth, paper, fibrous mat, aggregate beds made up of materials like cotton, wool, nylon, dacron or other synthetic materials and blends, glass filter, metal, carbon and mineral fibre. When operating within permissible working conditions like fibre temperature, humidity, moisture, particle abrasion, particle loading, chemical composition and operating cycles the entrappment efficiency is high. However, filtering requires large filter surface area, due to low ratio of stream volume flow capacity to filter area and high energy, in the form of pressure drop across the filter to overcome the filter resistance. Moreover, the particulate matter entrapped on the filter accumulates and builds up forming a layer of deposit. The periodical removal of the deposit becomes essential to maintain the pressure drop (up to 150 mm, 6 inches water column) and the consequential energy consumption within practical operating levels so as to avoid physical damage to the filter media. The deposit is removed by the usual procedures like mechanical rapping, vigorus shaking, air or gas reverse jet flow, washing technique (reverse jet causes problems like fatige failure and clogging or media). The process, besides some of the earlier mentioned application constraints, has the drawback of being intermittent in nature, i.e., non-continuous in respect of any one filter area thus requires alternative filter for the cleaning, reverse jet cycle operation, requiring large space requirement and high and variable energy consumption due to varying pressure drop.

These known systems have their respective application constraints and operational limitations some of which have been given here above.

The object of the invention is to provide a method, means and device to separate particulate matter and stream from carrier madium with improved performance and overcome the above mentioned drawbacks attendant with the known methods and devices.

BRIEF SUMMARY OF THE INVENTION

The subject invention provides for the removal of any particulate matter such as ash, dust, mineral, process particle products, liquids, mixtures and the like, from carrier medium-air, gases, vapour, flue, their like and mixture, is provided for by being blocked, intercepted, impinged and spun of by the moving form of a spinning body on being passed from outside, over and through the spinning body spinning about its axis, the spinning body being a disc or hollow three dimensional body, with thin perforated walls to give improved intrappment and operating performance, other parameters remaining the same.

It must be understood that a "moving form" wherever appearing in the specification and claims is a surface with finite thickness with perforations or apertures moving at a rapid pace depending upon the purpose and performance requirements giving a circular and/or linear motion to the surface. By way of example, it may take the form of a shell of a hollow spinning body or a wide band.

According to the present invention there is provided a method for the separation of particulate matter and stream from carrier medium comprising passing said carrier medium through perforated or apertured surface(s) on the moving face(s) of moving form(s), the said particulate matter being blocked, intercepted, impinged caused by the said perforated surface(s) of the moving form(s), deflected away from the carrier medium while the cleaned stream passes through said perforations.

The present invention also provides a means for the separation of particulate matter from carrier medium comprising a moving form, said moving form having a moving surface with perforations or apertures, said particulate matter of the carrier medium is blocked, intercepted, impacted and deflected away caused by the moving surface of said moving form on being passed over and through the said perforated surface of said moving form.

The present invention further provides a device for the separation of particulate matter and stream from carrier medium:

said device comprising a main housing with a carrier medium inlet, stream exit, particulate exit and a substantially hollow spinning body;

Within said housing, said stream exit being connected to a round adaptor with said spinning body mounted thereon having a matching adaptor revolving junction;

said matching adaptor dividing the spinning body into an inner face and an outer face, the inner face being the inner side of the spinning body and the outer face being the outer side of the hollow spinning body, said inner side being connected to said stream exit through said adaptor junction;

said spinning body having surface with perforations or apertures thereon being mounted on a rotatable shaft;

said carrier medium being under a draft to cause flow from said outer face and through said perforated surface of said spinning body, the particulate matter being blocked, intercepted, impacted caused by the perforated moving form of said spinning body, deflected and spun away from the flow of the carrier medium, collected inside main housing and ejected through said particulate exit while said stream passes through said perforations and stream exit.

An embodiment of the invention by way of example is described with reference to the accompanying drawings.

Figure 1:
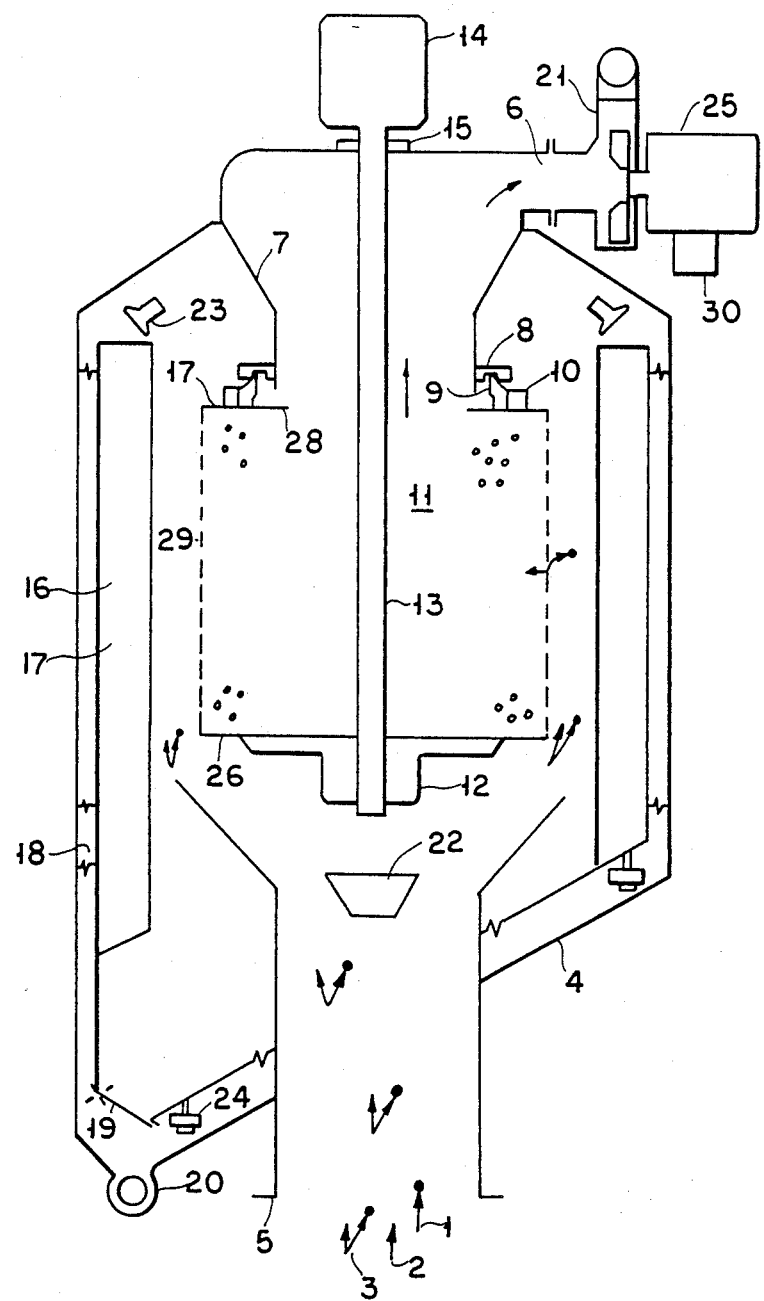
FIG. 1 shows schematically in sectional view a particulate separation device according to the invention.

In FIG. 1, a particulate separation device shows particulate matter -1- particle of dust, ash, mineral, combustion, particle products, process products as particles, liquids, mixtures and the like. Stream 2 comprising air, gases, vapour, flue, their mixtures and the like and carrier medium 3, represents the mixture of particulate matter 1 and stream 2. The movement, flow of the stream carries the particulate matter and is thereby termed as carrier medium 3. The housing 4, schematically shown in sectional view has an inlet port 5. The inlet port 5 has facility to be attached to a source not shown in the figure. The inlet port 5 extends as a duct inside the housing 4 and located generally symmetrical with respect to the axis of the spinning body and forms into a conical guide for the carrier medium 3 flowing to the spinning body 11.

In another embodiment the inlet port, aforesaid could well be in other position like the top end or radial with respect to the axis of the spinning body. In yet another embodiment there could be plurality of ports or an open inlet i.e. no inlet housing.

On the other upper end of the aforesaid housing 4 is the stream exit port 6. The exit port extends inside the housing 4 through the duct passage to the adaptor 7. The adaptor converges into a round section and has a seal seat 8 firmly mounted on to it. The other part of the seal housing 10 is mounted, fitted to the face 27 of the spinning body 11. The seal housing 10 on the spinning body carries the seal 9. The lip of the seal 9 is touching and fits the mating seat 8. The seat 8 is concentric to the axis of the spinning body 11. Thus when body 11 spins it carries the seal housing 10 and seal 9 in the rotational movement. The centrifugal force causes the lip of the seal 9 to further fly outward and give a leak resistant junction with the non-rotating seal seat 8. The junction between the adaptor 7 of exit port 6 and spin body 11 allows the free spinning of the body 11 about its axis resists any leak. Other forms and location of seals and arrangements are also possible.

In yet another embodiment, there may be a plurality of housings with a hollow spinning body in each of the housings or alternatively there may be a plurality of housings with a plurality of hollow spinning bodies in each of said housings.

Figure 2:
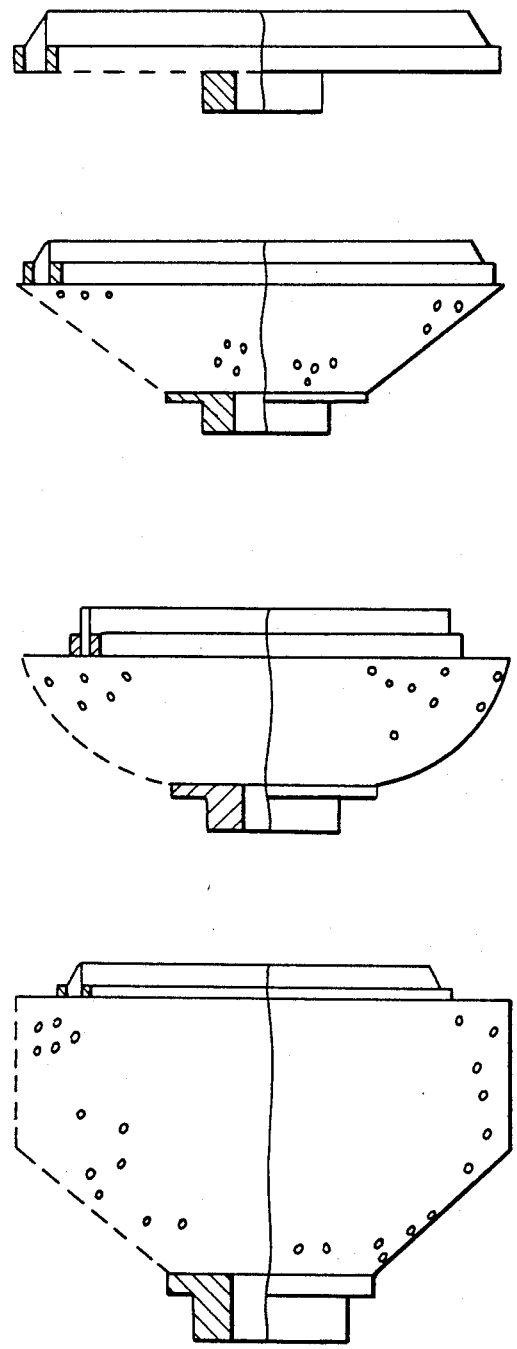
FIG. 2 shows schematically a few spinning body forms in the axi-symmetrical semi-sectional view with seal seat and seal.

The spinning body 11 is in the shape of a hollow cylinder. Some other shapes are illustrated in FIG. 2. Other shapes and forms including one and more walled perforated body combinations which are substantially hollow are possible. One or plurality of these forms can be used to operate in one or more stages to give one or multistage separation depending on the purpose and performance requirements.

The cylindrical spinning body 11, has one closed end 26 and the other end 27 has a port opening 28. The cylinder end 27 with the port 28 has the concentrically attached seal housing 10 and the seal 9. The cylinder closed end 26 housing hub 12, mounted on a shaft 13 of a motor drive 14. The shaft 13 goes out of the housing through a seal 15. Aforesaid drive 14 could also be prime mover, turbine, electric motor and the like.

The cylindrical side 29 of the cylindrical body 11 has perforations, apertures. The perforations, apertures provided in the form of hole, perforated sheet, screen, grating, louver, mesh and the like with supports. The cylinder spins on its axis mounted on the shaft 13 of the aforesaid motor 14. The aforesaid spin is controllable by electrical, mechanical and the like means. The face 27 can be radially supported by web to the hub or shaft for mechanical strengthening, specially in large sizes. The shaft 13 may have other support and arrangements in another embodiment.

Located around the spinning body 11 are particle entrapment baffles 16 at a sufficient radial distance. Other entrapment means like louvers, pads, shower devices are possible. The carrier medium coming axially approaches the spinning body through this radial distance as shown schematically in the FIG. 1.

The baffles 16 are located in a baffle housing 17 and isolated from the housing 4 through vibration isolation 18, being pads springs and the like means. The baffle housing 17 has its lower face shaped to allow entrapped material flow and collect at exit port 19. A trap gate at 19 allows the collected material to fall through a hopper arrangement into a screw conveyor 20. This ensures that while the collected material passes out practically no air can go in. Alternate means of evacuation are usable like rollers, conveyor, bags.

The baffles housing 17 has as an added feature, a vibrating mechanism 24, there are means like mechanical, electrical, pneumatic vibrators, rappers. The vibration of baffles 16 and housing 17 faciliates the release of collected particulate matter. Washing facility 23 for washing of the baffle 16, housing 17 yet another additional feature.

This facility is not required for non-sticking and non-compacting particulate materials.

The complete aforesaid and described device is so placed that the spinning axis, i.e., axis of the shaft 13 is near vertical. This facilitates the collection of the entrapped particles. The position of the aforesaid axis can be horizontal or in other plane, and have the collection facility accordingly altered in another embodiment as per the invention.

The construction of the system is for practical purpose leak proof for stream flow and only permits (1) stream movement along the route of inlet port 5 and its duct to the spinning body 11 where passage is through the perforations to the exit port 6 and (2) exit of collected particulate matter through port 19.

The stream flow in the direction from inlet port 5 to exit port 6 through the perforations i the spinning body is brought about by having a negative pressure, that is suction through adaptor 7 and inside the spinning body 11, and or by having a higher pressure, i.e., a force draft at the inlet port 5.

The device when used in conjunction, or part of a process cycle or by itself has the stream movement in the aforesaid direction and manner by setting pressure difference suited to the requisite entrapment level and flow movement in the process cycle.

Before the spinning body 11, is located conditioning facility 22 to treat chemically and physically gases and particle by conditioning agents and water, like introducing dry lime to chemically combine with sulphur dioxide to form sulphate particles, water spray to cause particles to agglomerate, to aid entrapment.

In FIG. 1, a suction device e.g. a centrifugal fan 21 driven by a motor 25 with regulation facility 30 is attached at exit port 6. The regulation facility 30 regulates motor 25 so as to influence the flow created by suction fan 21. The stream movement under the influence of suction created by the running of the suction centrifugal fan 21 is in the aforesaid direction of flow. The draft is controllable by methods like fan speed, aperture, gate and the like.

A carrier medium 3 comprising of particulate matter 1 and stream 2 coming from its source, not shown, is drawn in the inlet port 5 under the influence of the flow created by the regulatable suction fan 21, the carrier medium on entering at inlet port 5 passes through the duct and after being conditioned, if required as earlier explained by the conditioning facility 22 reaches the spinning body 11. The particles are blocked, intercepted and impacted by the moving form of the thin wall perforated body 11 spinning about its axis and are spun away while the stream 2 passes through the perforation on the surface 29 of the spinning wheel as a cleaned stream and goes out of the spinning body 11 guarded by rotating seal junction 8, 9, 10 into the adaptor 7, exit port 6, and expelled by fan 21.

In this way particulate matter is effectively and efficiently separated from the carrier medium to give a cleaned stream. Deflection, separation of particles is caused by the blocking, interception and impaction of particle by the perforated moving surface and is under the influence of parameters like, form of perforated moving surface, angle of impacting surface and approach of particle, the relative velocity, speed, and the generated forces.

Aforesaid particles, separated from the medium and spun away by the spinning perforated surface are deflected away from the flow of the incoming carrier medium and enter the baffles 16 and housing 17 and are entrapped. The entrapped particles drop and are collected and ejected out at particle exit port 19 and conveyed out of the device by the screw conveyor 20. The release of the particles in the collecting zone is aided by vibrating the baffles 16 and housing 17 by the vibrating facility 24.

The particulate matter, irrespective of the shape, composition, size is directly blocked, intercepted, impacted and thus spun away and entrapped to give high entrapment efficiency with low energy consumption. Other embodiments are possible within the scope of the present invention and used for processes, heat transfer, pollution control and the like. Features like low and high electric resistivity of the particle, wetting characteristics of particle, variation in moisture, temperature, load and nature of the particle, presence of carbon monoxide or other explosive materials do not or marginally affect the high efficiency of the system. The equipment is compact, suited for a wide range of applications and viable for various capacity ranges.

I claim:

1. A device, for the separation of particulate matter and a stream of gases in a carrier medium, comprising:
   at least one housing having an interior portion and exterior portion;
   at least one carrier medium inlet on said housing in fluid communication with said interior;
   a stream exit portion of said housing upstream of said inlet, said stream exit portion is in fluid communication with said interior portion for the removal of said stream of gases from said housing;

- a draft inducing means connectable to said housing so as to induce a flow in said carrier medium from said carrier medium inlet to said stream exit portion;
- at least one baffle housing attached to said housing and placed within said interior portion for collecting the particulate matter separated from the carrier medium; and
- at least one hollow rotatable body, within said interior portion of said housing, having an inner surface in fluid communication with said exit portion and said interior portion through apertures in said body that are larger in size than the particulate matter and which define angled impacting surfaces, said body is connectable to a drive means so as to be rotatable in a transverse direction to the carrier medium within said interior portion so that the particulate matter is intercepted by the impacting surfaces and deflected towards the particulate matter entrapment means while the separated stream of gases passes through the apertures, into the inner portion of body, and out said housing through said exit portion.

2. The device as claimed in claim 1 further comprising a conditioning means to chemically and physically treat the carrier medium by conditioning agents, said conditioning means is located within said housing upstream of said inlet and downstream of said rotatable body.

3. The device as claimed in claim 1 wherein a seal is provided between said rotatable body and said exit portion so that a leak-proof passage is formed between the inner portion of said rotatable body and the exit portion.

4. The device as claimed in claim 1 wherein said draft inducing means is adjustable so as to vary the flow in said interior portion and includes a draft fan mounted inside a fan housing.

5. The device as claimed in claim 1 wherein said drive means is located outside said housing and said shaft passes out of said housing through a housing seal.

6. The device according to claim 1, wherein the rotatable body is spherically shaped.

7. The device according to claim 1 wherein the rotatable body is conically shaped.

8. The device according to claim 1 wherein the rotatable body is thin walled.

9. The device as claimed in claim 1 wherein said baffle housing is separated from the housing by at lease one vibration isolator.

10. The device as claimed in claim 9 wherein the baffle housing is connected to a vibration means to release the collected particulate matter into a particulate matter exit in fluid communication with said baffle housing.

11. The device as claimed in claim 10 wherein said particulate matter exit is connectable to a means for non-returnable material evacuation and handling.

12. The device according to claim 11 wherein a washing means in the interior portion, and in fluid communication with the baffle housing, washes the baffle housing to dislodge the entrapped particulate matter.

13. A method of separating particulate matter and a stream of gases from a carrier medium comprising the steps of:

- moving the carrier medium through a carrier medium inlet, on at lease one housing, into an interior portion of said housing by the use of a draft inducing means connectable to said housing, an exit portion is in fluid communication with said interior portion and upstream of said inlet portion; and
- rotating at least one hollow rotatable body, within the interior portion and connectable to a drive means, in a transverse direction to the carrier medium so that the particulate matter is intercepted by angled impacting surfaces on the rotatable body and deflected towards at least one baffle housing in said interior portion while the separated stream passes through apertures on the body in an inner portion of said rotatable body, in fluid communication with said exit portion, so as to be moved towards the exit portion, said apertures being larger in size than the particulate matter and define said impacting surfaces.

* * * * *